US012155989B2

(12) United States Patent
Choi et al.

(10) Patent No.: US 12,155,989 B2
(45) Date of Patent: Nov. 26, 2024

(54) METHOD AND ELECTRONIC DEVICE FOR PROVIDING AMBIENT SOUND WHEN USER IS IN DANGER

(71) Applicant: Samsung Electronics Co., Ltd., Gyeonggi-do (KR)

(72) Inventors: Changlim Choi, Gyeonggi-do (KR); Jeongmin Park, Gyeonggi-do (KR); Hoseong Lee, Gyeonggi-do (KR); Seongmin Je, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 223 days.

(21) Appl. No.: 17/896,328

(22) Filed: Aug. 26, 2022

(65) Prior Publication Data

US 2022/0408178 A1 Dec. 22, 2022

Related U.S. Application Data

(63) Continuation of application No. PCT/KR2022/007471, filed on May 26, 2022.

(30) Foreign Application Priority Data

Jun. 17, 2021 (KR) .......................... 10-2021-0078731

(51) Int. Cl.
*H04R 1/10* (2006.01)
*G06F 3/01* (2006.01)

(52) U.S. Cl.
CPC ........... *H04R 1/1083* (2013.01); *G06F 3/012* (2013.01); *H04R 1/1016* (2013.01)

(58) Field of Classification Search
CPC .... H04R 1/1083; H04R 1/1016; H04R 5/033; H04R 1/1041; H04R 1/22; H04R 5/04; H04R 2430/01; G06F 3/012; H04S 7/304; H04S 2400/13
USPC ........................................................ 381/71.6
See application file for complete search history.

(56) References Cited

U.S. PATENT DOCUMENTS

| 10,555,066 B1 | 2/2020 | Bunney et al. |
| 2014/0185828 A1 | 7/2014 | Helbling |
| 2018/0359554 A1 | 12/2018 | Razouane et al. |
| 2020/0105238 A1 | 4/2020 | Kulavik et al. |
| 2022/0020260 A1* | 1/2022 | Hamada ................. H04M 1/00 |

FOREIGN PATENT DOCUMENTS

| JP | 2015-211267 | 11/2015 |
| JP | 6-528263 | 5/2019 |
| JP | 2021-052227 | 4/2021 |

(Continued)

OTHER PUBLICATIONS

International Search Report dated Sep. 1, 2022 issued in counterpart application No. PCT/KR2022/007471, 3 pages.

(Continued)

*Primary Examiner* — Paul Kim
(74) *Attorney, Agent, or Firm* — The Farrell Law Firm, P.C.

(57) ABSTRACT

An electronic device is disclosed which may collect inertia information and ambient sound, determine whether a user is in danger by monitoring impact sound and a mismatch between a head orientation and a moving direction of a user, and provide the ambient sound collected when it is determined that the user is in danger.

17 Claims, 13 Drawing Sheets

(56) References Cited

FOREIGN PATENT DOCUMENTS

| | | |
|---|---|---|
| KR | 10-1646503 | 8/2016 |
| KR | 10-2017-0076181 | 7/2017 |
| KR | 10-1926429 | 3/2019 |

OTHER PUBLICATIONS

European Search Report dated Sep. 23, 2024 issued in counterpart application No. 22825177.3-1207, 10 pages.

* cited by examiner

METHOD AND ELECTRONIC DEVICE FOR PROVIDING AMBIENT SOUND WHEN USER IS IN DANGER

CROSS-REFERENCE TO RELATED APPLICATIONS

This application is a bypass continuation application of International Application No. PCT/KR2022/007471, filed in the Korean Intellectual Property Receiving Office on May 26, 2022, and claiming priority to Korean Patent Application No. 10-2021 0078731, filed in the Korean Intellectual Property Office on Jun. 17, 2021, the entire disclosure of each of which are incorporated herein by reference.

BACKGROUND

1. Field

The present disclosure relates generally to a method of providing ambient sound when a user is in danger.

2. Description of Related Art

A stereo headset may primarily shield external sound by mechanically enclosing an ear of a user with an earcup, and may provide a function that additionally reduces external sound. This function may provide the user with a focused experience with music by shielding external noise.

Since the stereo headset provides stronger acoustical isolation and higher immersion than earbuds, a user scenario is typically one where the user is sitting and listening to music rather than moving as with earbuds. However, as true wireless stereo (TWS) technology develops, the user may move relatively freely while wearing a stereo headset.

However, the user may not recognize an external situation due to noise shielding, and may not receive auditory information in case of an emergency. The user wearing the stereo headset may be insensitive to detecting impact around the user, compared to a user wearing earbuds, and may be more frequently exposed to an unexpected situation and danger.

SUMMARY

An aspect of the present disclosure provides an electronic device for determining whether to provide ambient sound based on whether a direction of gaze of a user, who wears a stereo headset device, match a moving direction.

An aspect of the present disclosure provides an electronic device for determining whether to provide ambient sound based on a head rotation speed of a user, who wears a stereo headset device.

An aspect of the present disclosure provides an electronic device for determining whether to provide ambient sound based on a volume level of the ambient sound around a user, who wears a stereo headset device.

According to an embodiment, an electronic device includes an inertia sensor configured to sense inertia of the electronic device while the electronic device is worn on an ear of a user; a processor configured to monitor a mismatch between a moving direction and a head orientation of the user by using inertia information on the sensed inertia, and determine whether the user is in danger based on a result of monitoring the mismatch between the moving direction and the head orientation; a sound sensor configured to collect ambient sound; and a pair of speakers configured to output collected ambient sound while the user is in danger.

According to an embodiment, a method performed by an electronic device includes sensing inertia of the electronic device while the electronic device is worn on an ear of a user; monitoring a mismatch between a moving direction and a head orientation of the user by using inertia information related to the sensed inertia; determining whether the user is in danger based on a result of monitoring the mismatch between the moving direction and the head orientation; and outputting collected ambient sound while determining that the user is in danger.

According to an embodiment, an electronic device includes an inertia sensor configured to sense inertia of the electronic device while the electronic device is worn on an ear of a user; a sound sensor configured to collect ambient sound; a processor configured to determine that the user is in danger in response to a failure in detecting head rotation of the user by using inertia information related to the sensed inertia from a time point of detecting sound, which exceeds a threshold volume level, from ambient sound until a predetermined threshold response time elapses; and a pair of speakers configured to output collected ambient sound while the user is in danger.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
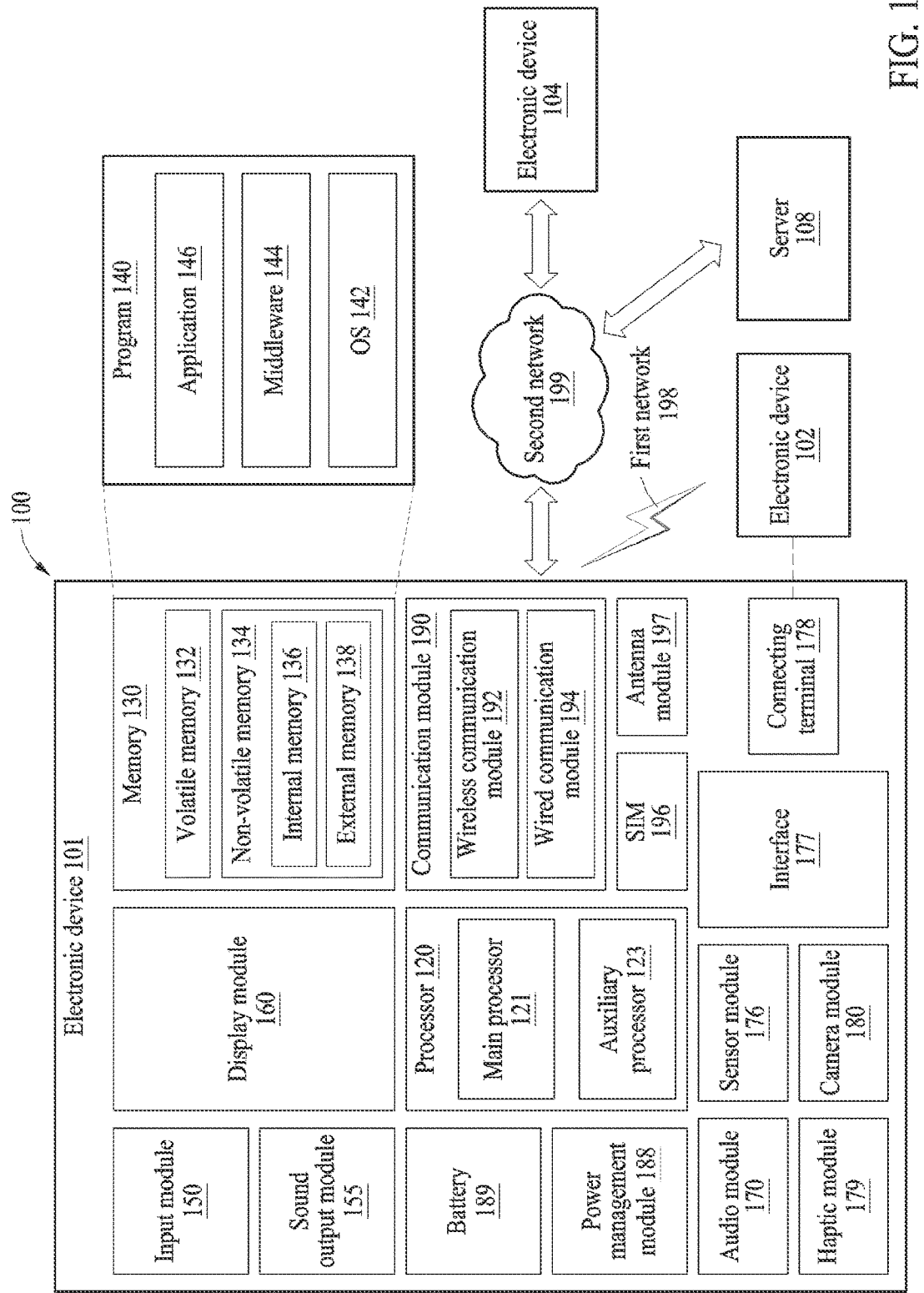
FIG. 1 is a block diagram of an electronic device according to an embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments, at least one of the components (e.g., the connecting terminal 178) may be omitted from the electronic device 101, and/or one or more other components may be added in the electronic device 101. Some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation operations. As at least a part of data processing or computation operations, the processor 120 may store a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent DNN (BRDNN), a deep Q-network, or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), and/or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing recorded material. The receiver may be used to receive an incoming call. The receiver may be implemented separately from the speaker or as a part of the speaker. The sound output module 155 may include, for example, a pair of speakers. Each of the speakers may be placed on an ear of a user when the electronic device is worn.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. The display module 160 may include a touch sensor adapted to detect a touch, or a pressure sensor adapted to measure the intensity of force incurred by the touch. The audio module 170 may convert a sound into an electrical signal or vice versa.

The audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. The sensor module 176 may include, for example, a gesture sensor, a gyro sensor, an atmospheric pressure sensor, a magnetic sensor, an inertia sensor (e.g., a combination of an acceleration sensor and the gyro sensor), a grip sensor, a proximity sensor, a color sensor, an infrared (IR) sensor, a biometric sensor, a temperature sensor, a humidity sensor, an illuminance sensor, or a sound sensor (e.g., a microphone). For example, the proximity sensor and the grip sensor may function as a wear detecting sensor, which is described below.

The interface 177 may support one or more specified protocols to be used for the electronic device 101 to be coupled with the external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected to an external electronic device (e.g., the electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. The haptic module 179 may include, for example, a motor, a piezoelectric element, and/or an electric stimulator.

The camera module 180 may capture a still image and moving images. The camera module 180 may include one or more lenses, image sensors, image signal processors, and/or flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the electronic device 102, the electronic device 104, and/or the server 108) and performing communication via the established communication channel. The communication module 190 may include one or more communication processors that are operable independently of the processor 120 (e.g., an AP) and that support a direct (e.g., wired) communication or a wireless communication. The communication module 190 may include a wireless communication module 192 (e.g., a cellular communication module, a short-range wireless communication module, and/or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, for example, a high data transmission rate. The wireless communication module 192 may support various technologies for securing performance on a high-frequency band, such as beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. Another component (e.g., a radio frequency integrated circuit (RFIC)) other than the radiating element may be additionally formed as a part of the antenna module 197.

The antenna module 197 may form an mmWave antenna module. The mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. All or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of or in addition to executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. The external electronic device 104 may also include an Internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT related technology.

The electronic device according to various embodiments may be one of various types of electronic devices. The electronic device may include, for example, a portable communication device (e.g., a smartphone), a computer device, a portable multimedia device, a portable medical device, a camera, a wearable device (e.g., a stereo headset device), or a home appliance device, but is not limited to those described above.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C", each of which may include any one of the items listed together in the corresponding one of the phrases, or all possible combinations thereof. Terms such as "first", "second", or "1st" or "2nd" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. One or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
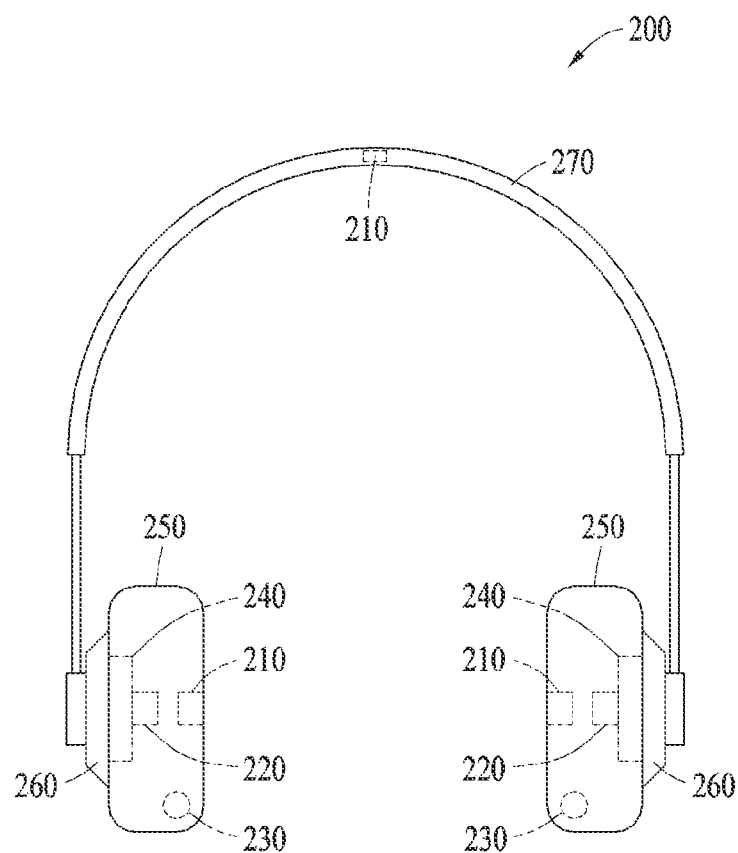
FIG. 2 illustrates an electronic device according to an embodiment.

FIG. 2 illustrates an electronic device according to an embodiment.

An electronic device 200 may be a stereo headset device configured to prevent ambient sound (e.g., external noise) from being delivered to an eardrum of a user, and play sound provided by another electronic device (e.g., the electronic device 102 of FIG. 1) through a speaker 240. The electronic device 200 may include a wear detecting sensor 210, an inertia sensor 220, a sound sensor 230, the speaker 240, an earpiece 250, a touch sensor 260, and a housing (e.g., a headband 270). In addition, the electronic device 200 may include a processor 120 and a communication module 190. However, the shape of the electronic device 200 as illustrated in FIG. 2 is an example, and the shape is not limited thereto.

The wear detecting sensor 210 may sense whether the electronic device 200 is worn on a head and/or an ear of a user, and may sense a posture in which the electronic device 200 is worn on a body part (e.g., the head or neck) of a user. For example, the electronic device 200 may be worn on an ear or the neck of a user. A processor of the electronic device 200 may determine a body part on which the electronic device 200 is worn, based on data obtained by sensing by the wear detecting sensor 210. In addition, the electronic device 200 may determine whether the earpiece 250 is in a normal posture or a rotated posture in a backward direction with respect to the housing (e.g., the headband 270), based on the data obtained by sensing by the wear detecting sensor 210. A plurality of wear detecting sensors 210 may be provided, and each of the wear detecting sensors 210 may run independently. For example, a head proximity detecting sensor, which is one of the plurality of wear detecting sensors 210 and placed on part of the head, may include at least one of a capacitive sensor and a resistive sensor, and an ear proximity detecting sensor placed on the side of the ear may include an optical sensor. Data obtained by sensing by the head proximity detecting sensor may be used for determining a wearing state (e.g., a normal posture or a rotated posture in which an earpiece is rotated in a backward direction). The ear proximity detecting sensor may include a first ear proximity detecting sensor placed on an ear, and a second ear proximity detecting sensor placed on the other ear. Data obtained by sensing by the ear proximity detecting sensor may be used for determining whether the earpiece is worn on an ear.

In the stereo headset device, an inner surface of the earpiece 250 may typically face toward the inside (e.g., a space between the earpieces 250). However, the inner surface of the earpiece 250 may be reversed to face toward the outside (e.g., an outer space, which is not the space between the earpieces 250) by a mechanical joint structure between the earpiece 250 and the housing. Since sound of the speaker 240 may be output in a direction in which the inner surface of the earpiece 250 faces, in case the earpiece 250 is reversed, a direction of outputting the sound may be reversed. In case one earpiece 250 of the pair of earpieces 250 is reversed, the electronic device 200 may determine the proximity between the one earpiece 250 and a body part of a user. Accordingly, the electronic device 200 may determine various wearing states, such as a normal wearing, wearing on one side, wearing the headband 270 down on the neck, and wearing the stereo headset device on the neck, based on various types of the stereo headset device.

The wear detecting sensor 210, for example, may include at least one of a proximity sensor and a grip sensor.

The proximity sensor may be a sensor identifying proximity. The electronic device 200 may determine the above-described wearing state, based on data obtained by sensing by the proximity sensor. The proximity sensor may be, for example, an optical proximity sensor using an IR ray light-emitting diode (IR LED) and a photodiode. In the optical proximity sensor, a light receiver (e.g., the photodiode) may receive an optical signal emitted from a light emitter (e.g., the IR LED). The electronic device 200 may determine proximity based on a distance calculated by an intensity of received light or a time difference between light emission and light reception. However, the example is not limited thereto, and the proximity sensor may be implemented by an ultrasonic sensor configured to transmit and receive an ultrasonic wave. In the ultrasonic sensor, a transmitter may transmit an ultrasonic signal and a receiver may receive an ultrasonic signal. The electronic device 200 may determine proximity based on a distance calculated by an intensity of a received ultrasonic signal or a time difference between transmission and reception of the ultrasonic wave.

The above-described proximity sensor may be placed on the outside and/or the inside of the earpiece 250. The processor may obtain data (e.g., the above-described signal reception intensity, the signal reception time, and the distance) related to proximity between the earpiece 250 and a body part (e.g., an ear) of the user, by sensing by the proximity sensor. A plurality of proximity sensors may be placed on one earpiece 250. In addition, a proximity sensor may be mounted on each of the earpieces 250 (e.g., the earpiece 250 corresponding to the left ear and the earpiece 250 corresponding to the right ear).

The proximity sensor may be mounted on the headband 270. Through sensing by the proximity sensor mounted on the headband 270, the processor may obtain data related to whether the electronic device 200 is worn on the ear(s) of the user. For example, although the earpiece 250 is worn on the ear of the user, the headband 270 may be not worn on the top of the head of the user. The electronic device 200 may include an additional proximity sensor for determining the above-described various wearing states.

The grip sensor may sense touch or contact by a capacitance method. The grip sensor may be placed on the earpiece 250 and/or the headband 270. When the electronic device 200 includes both the proximity sensor and the grip sensor together, an error related to determining attachment or detachment of the electronic device 200 may be prevented when the user is wearing the electronic device 200. In other words, the accuracy of determining a wearing state may be improved by combining and using data obtained by sensing by the proximity sensor and the grip sensor. The grip sensor may be, similar to the above-described proximity sensor, mounted on each of the earpieces 250. In addition, since the grip sensor and the touch sensor 260 have the same sensing and processing mechanism, the grip sensor and the touch sensor 260 may share and use one processing module. However, the example is not limited thereto, and a processing module configured to process data of the grip sensor and the touch sensor 260 may be divided into separate modules.

The inertia sensor 220 may be a sensor configured to sense inertia (e.g., force), and may sense an amount of pose change that occurred by movement of the user. The processor may generate inertia information (e.g., acceleration data indicating an acceleration and angular velocity data indicating an angular velocity) by sensing inertia obtained by the inertia sensor 220. For example, the inertia sensor 220 may include an acceleration sensor, a gyro sensor, or a combination of an acceleration sensor and a gyro sensor. The acceleration sensor may sense an acceleration with respect to three axes, and the gyro sensor may sense an angular velocity based on three axes. The inertia sensor 220 may be referred to as a six-axis sensor. Alternatively, an integrated sensor integrating the acceleration sensor with the gyro sensor may output an integrated value integrating an output value of the acceleration sensor with an output value of the gyro sensor, and may be referred to as a software (SW) sensor (e.g., a game rotation vector sensor). The inertia sensor 220 may be provided as a pair (e.g., two pieces) and may be accommodated in each of the earpieces 250, and the pair of inertia sensors 220 may be connected to a single processor and may support fast head tracking with low power consumption without time latency. A disposition of a reference axis of the acceleration sensor and the gyro sensor is described with reference to FIG. 3.

The sound sensor 230 may sense a sound signal. For example, the sound sensor 230 may sense and collect ambient sound and a voice of the user, and may be implemented as a microphone. The sound sensor 230 may sense a sound signal caused by uttering of the user. The sound sensor 230 may include a plurality of microphones. Based on a beam-forming technique, the electronic device 200 may recognize a voice uttered from the mouth of the user with a higher recognition rate, based on a comparison between a sound signal obtained by sensing by a microphone placed close to the mouth of the user and a sound signal obtained by sensing by a microphone placed far from the mouth of the user.

In addition, sound sensors 230 placed on various portions of the electronic device 200 may sense various external sounds. For example, each of the sound sensors 230 mounted on the first earpiece (e.g., the earpiece 250 equipped on the left ear), the second earpiece (e.g., the earpiece 250 equipped on the right ear), and the headband 270 of the electronic device 200 may generate a sound signal by sensing sound at an individual volume depending on a location of a sound source based on the electronic device 200. The electronic device 200 may estimate a direction of the sound source based on the sound signal obtained by sensing by the sound sensor 230 mounted to each portion of the electronic device 200. For example, in case sound signals having a same waveform are sensed by sound sensors 230 placed on the earpieces 250 on the left and right, a volume of the sound signal sensed by the sound sensor 230 placed on the left side (e.g., left earpiece) may be greater than a volume of the sound signal sensed by the sound sensor placed on the right side. The electronic device 200 may determine that the sound source causing the sound is on the left side of the electronic device 200.

In addition, the electronic device 200 may utilize the sound sensor 230 and the inertia sensor 220 as a voice pick-up (VPU) sensor for determining whether a user (hereinafter, a "wearer") wearing the electronic device 200 utters a sound. For example, the inertia sensor 220 may sense subtle vibrations caused by the utterance. The electronic device 200 may determine whether the wearer utters a sound by connecting inertia data obtained by sensing the subtle vibration occurring due to the utterance using the inertia sensor 220 with a sound signal obtained by sensing by the sound sensor 230 (e.g., the microphone). The electronic device 200 may identify whether the sensed sound is a sound generated by the user or an external sound, by detecting the utterance. In other words, the electronic device 200 may accurately determine context of the sound source.

The speaker 240 may be a module configured to output sound. In case the electronic device 200 worn on the ear of the user receives sound data from another external device, the speaker 240 may output sound corresponding to the received sound data. Outputting the sound may be referred to as playing or play back. The speaker 240 may include various components, such as a tweeter and/or a woofer.

The touch sensor 260 may sense a gesture, such as a swiping action and touching by a finger of the user. In response to touch data obtained by sensing by the touch sensor 260, the electronic device 200 may perform operations including at least one or a combination of two or more of playing music, stop playing music, playing a next song, and playing a previous song. FIG. 2 illustrates that the touch sensor 260 is placed on an outer surface (e.g., a surface facing an outer space, not a space between earpieces) of the earpiece 250; however, this example is not limited thereto.

As described with reference to FIG. 1, the processor may include an AP, a CP, and/or an auxiliary processor. An operation of the processor is described in detail with reference to FIGS. 4 to 13.

The communication module may be a module configured to communicate wirelessly with the outside. The communication module may establish communication with another device and/or an access point via at least one of a Bluetooth™ (BT) network, a wireless fidelity (Wi-Fi) network, an ANT+ network, a long-term evolution (LTE) network, a 5th generation (5G) network, and a narrowband IoT (NB-IoT) network, or a combination of two or more thereof. For reference, in the present disclosure, the pair of earpieces 250 of the electronic device 200 are connected by a wire in the housing; however, this example is not limited thereto. A component (e.g., the processor, the speaker 240, the inertia sensor 220, the sound sensor 230, and the wear detecting sensor 210) included in one earpiece 250 of the pair of the earpieces 250 may be wirelessly connected to a component included in the other earpiece 250 via the communication module. The component included in the earpiece 250 may wirelessly transmit and receive data and/or a signal to and from the component included in the other earpiece 250 via the communication module.

The earpiece 250 may be a piece covering one ear of the user when the electronic device 200 is worn, and may be provided as a pair. The earpiece 250 may accommodate at least one or a combination of two or more of the wear detecting sensor 210, the inertia sensor 220, the sound sensor 230, the speaker 240, the touch sensor 260, the processor, and the communication module. Components included in the electronic device 200 may be distributed and accommodated in each of the earpieces 250. The pair of earpieces 250 may be connected to each other through the housing (e.g., the headband 270). In case the electronic device 200 is worn on an ear of the user, the pair of earpieces 250 may seal each ear of the user from ambient sound. For example, the earpiece 250 may include an earpad for sealing the ear of the user from ambient sound. Although FIG. 2 illustrates that the earpiece 250 is larger than an ear of the user, this example is not limited thereto. The earpiece 250 may seal the ear by filling an external auditory meatus of the user, such as a canal type. Since a shape of a stereo headset device in an on-ear or over-ear type is designed to focus on sound quality by shielding external noise, the stereo headset device may be vulnerable to external noise detection, and thus, may require determining danger, as described below.

In addition, a physical control interface may be provided in the earpiece 250 (e.g., an outer surface of the earpiece 250) and/or the headband 270. The physical control interface may be a physical user interface (PUI) including a button and/or a switch. The physical control interface may receive a user input for turning on power or performing a predetermined function.

Figure 3:
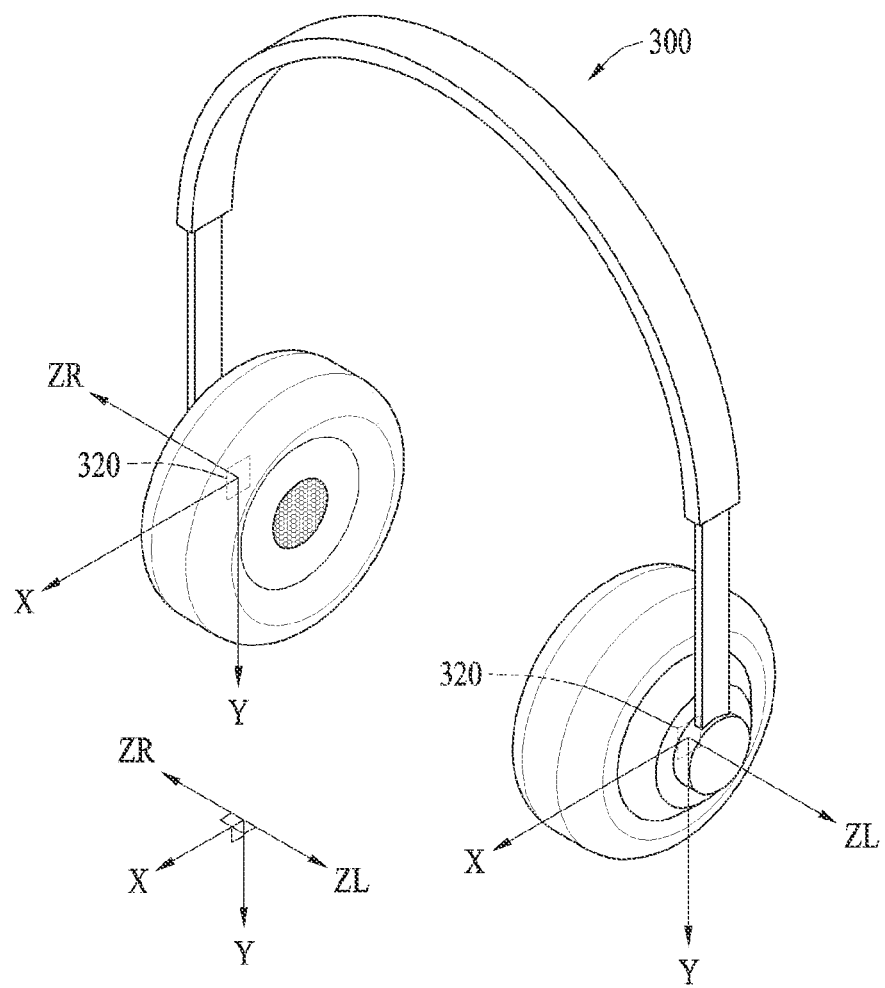
FIG. 3 illustrates an acceleration sensing axis of an electronic device according to an embodiment.

FIG. 3 illustrates an acceleration sensing axis of an electronic device according to an embodiment.

As described above with reference to FIG. 2, an inertia sensor 320 of an electronic device 300 may include an acceleration sensor (or an accelerometer) and a gyro sensor (or a gyroscope). The acceleration sensor may sense force or acceleration applied in a linear direction along an X axis, a Y axis, and a Z axis. For the electronic device 300, which is worn in a normal posture, in the acceleration sensor, the Y axis may indicate a direction of gravity (e.g., a direction perpendicular to ground), the X axis may indicate a direction (e.g., a direction parallel to ground) perpendicular to the Y axis in the normal posture, and the Z axis may indicate a direction (e.g., a direction reverse to a direction of outputting sound by an earpiece) to which an outer surface of the earpiece faces in the normal posture. The gyro sensor may sense an angular velocity of rotation based on the X axis, the Y axis, and the Z axis. For reference, FIG. 3 illustrates the electronic device 300 worn in the normal posture.

The electronic device 300 may include a pair of earpieces, and the inertia sensor may be accommodated in each of the earpieces. In other words, the electronic device 300 may include a pair of the inertia sensors. The pair of the inertia sensors may be placed symmetrical to each other. For example, the pair of the inertia sensors may be placed symmetrical based on a virtual surface between the earpieces. In the inertia sensor of the electronic device 300 worn by a user in a normal posture, a Y axis may be a direction of gravity, and an X axis may be a direction of a gaze and/or a head of the user wearing the electronic device 300 while being perpendicular to the Y axis. A ZL axis may be a Z axis of the inertia sensor accommodated in an earpiece worn on the left ear of the user. A ZR axis may be a Z axis of the inertia sensor accommodated in an earpiece worn on the right ear of the user. The ZL axis and the ZR axis may be parallel to each other when worn by the user; however, these axes may be in opposite directions to each other.

Figure 4:
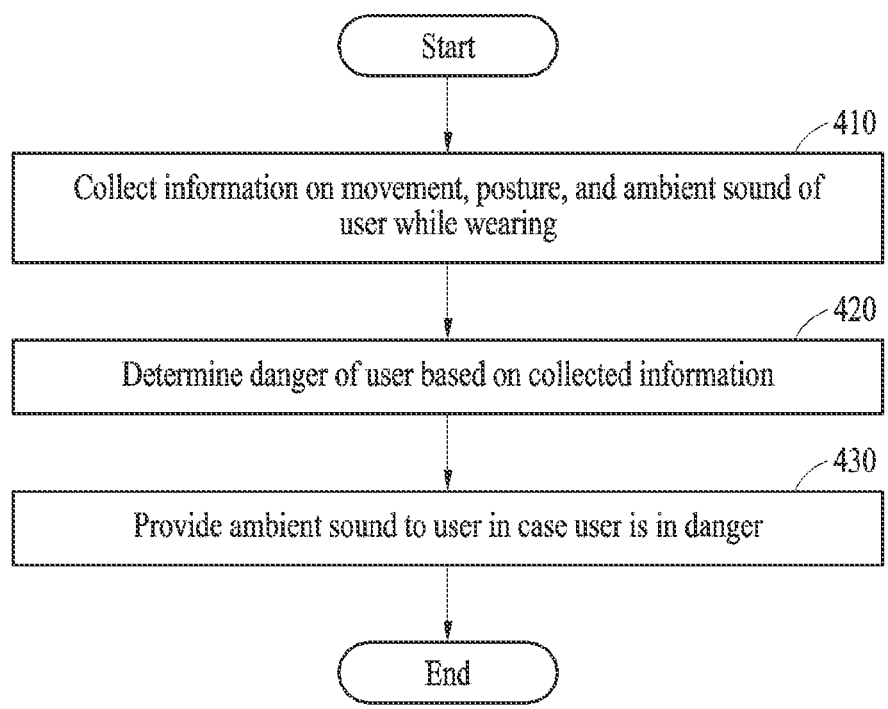
FIG. 4 is a flowchart illustrating an operating method of an electronic device according to an embodiment.

FIG. 4 is a flowchart illustrating an operating method of an electronic device according to an embodiment.

In step 410, while worn by a user, an electronic device 200 may collect information related to at least one of movement, posture, and ambient sound of the user, or a combination of two or more thereof. As described above, a user wearing a stereo headset device, which has an earpiece that seals an ear of the user, may be exposed to a potentially dangerous situation due to sound sealing. For example, the electronic device may collect information related to movement of the user (e.g., acceleration data, a moving distance, a moving speed, a moving acceleration, and a moving direction of the user), information related to a posture (e.g., a direction in which a head is pointing, an angular velocity of head rotation, an angular acceleration of head rotation, and angular acceleration data), ambient sound (e.g., an obtained sound signal), and information related to ambient sound (e.g., a volume level of sound), as various pieces of data for determining whether the user is in danger.

In step 420, the electronic device may determine whether the user is in danger, based on the collected information. For example, the electronic device may determine whether the user is in danger, based on at least one or a combination of two or more of the information related to movement of the user, the information related to a posture, and the information related to ambient sound.

In step 430, in case the user is in danger, the electronic device may provide the ambient sound to the user. The electronic device may output the ambient sound collected while determining that the user is in danger. The electronic device may continue to provide the ambient sound during a predetermined play time and/or until the danger to the user disappears.

Hereinafter, an operation of determining whether the user is in danger by using collected data is described according to various embodiments.

Figure 5:
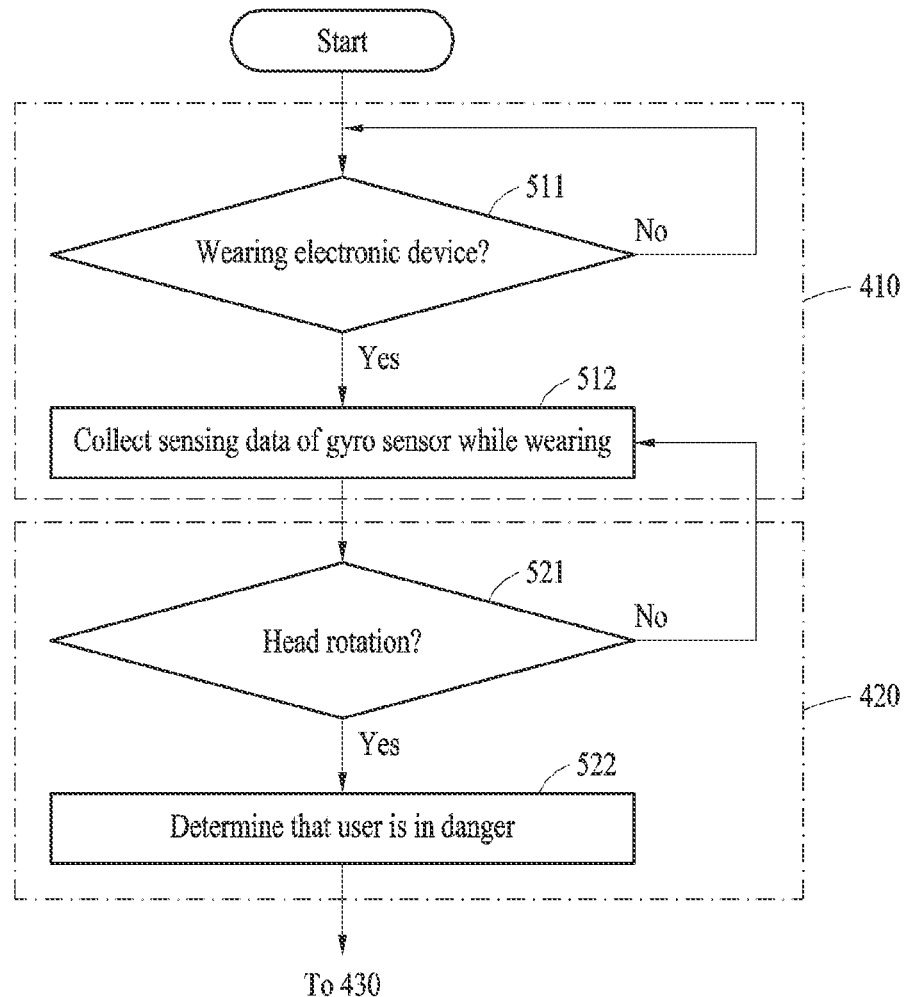
FIGS. 5 and 6 illustrate an operation, performed by an electronic device, of determining danger based on whether a head of a user has rotated, according to an embodiment.
Figure 6:
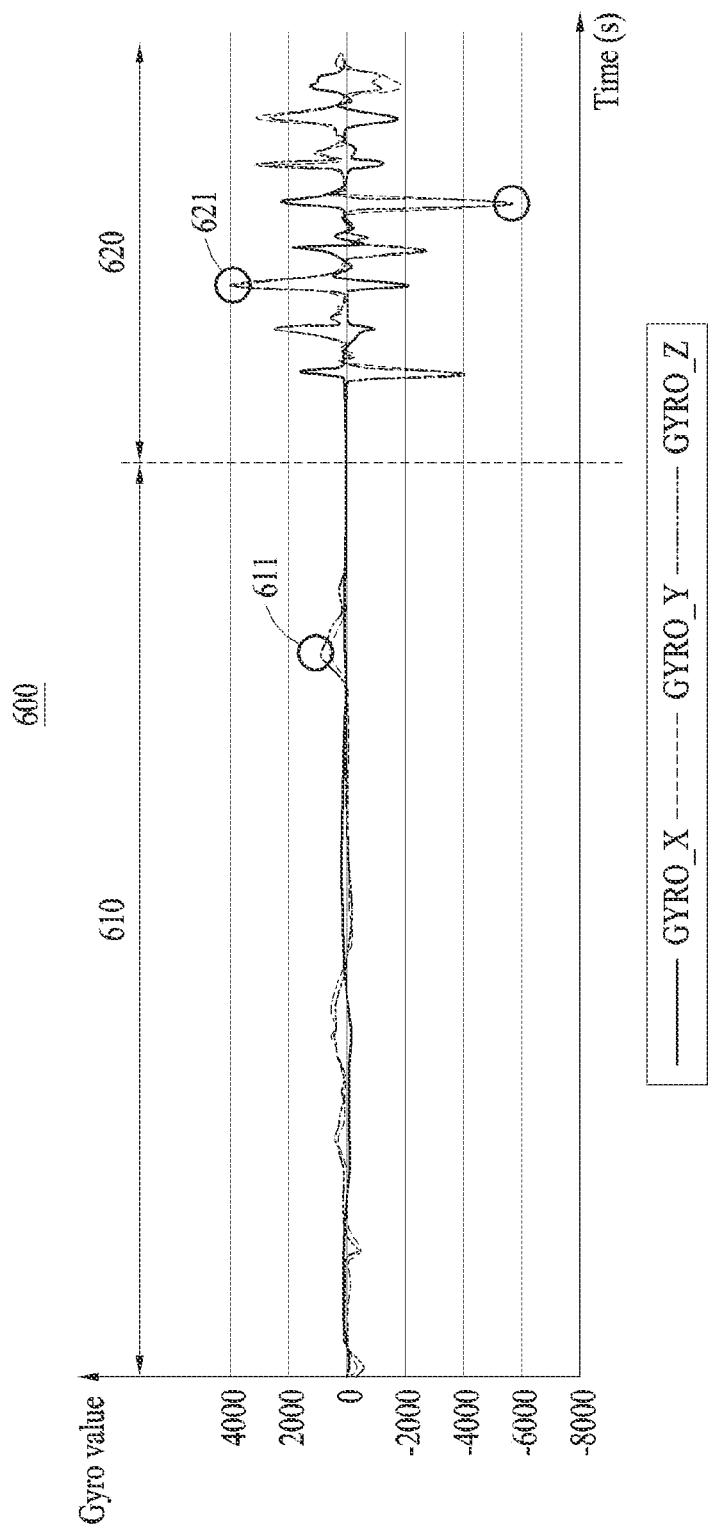
Figure 7:
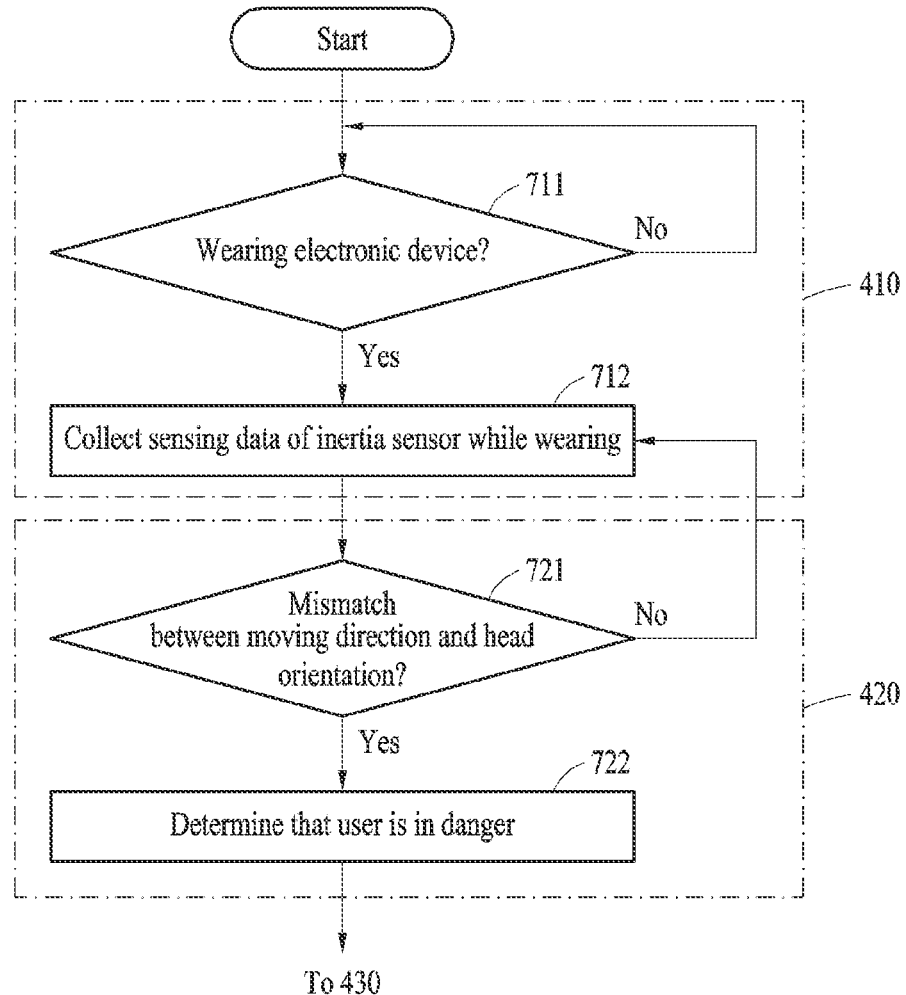
FIGS. 7 to 10 illustrate an operation, performed by an electronic device, of determining danger based on a moving direction and a head orientation of a user, according to an embodiment.

FIGS. 5 and 6 illustrate an operation, performed by an electronic device, of determining danger, based on whether a head of a user has rotated, according to an embodiment.

In step 511, an electronic device may monitor whether a user wears the electronic device. For example, the electronic device may determine whether earpieces cover both ears of the user. The electronic device may determine whether the electronic device is worn, based on data obtained by the above-described wear detecting sensor. For example, the electronic device may determine that the user is wearing the electronic device in case a distance, which is calculated by the data obtained by the wear detecting sensor, between the earpieces and a head of the user is less than a threshold distance.

In step 512, the electronic device may collect sensing data (hereinafter, referred to as "angular velocity data") of a gyro sensor while the electronic device is worn. For example, while the electronic device is worn on an ear of the user, the electronic device may collect the angular velocity data of the electronic device. However, this example is not limited thereto, and the electronic device may also collect acceleration data together with the angular velocity data while the electronic device is worn on the ear of the user. For reference, the electronic device may collect at least one of the angular velocity data and the acceleration data from a time point of detecting the electronic device being worn on the head of the user to a time point of removing the electronic device from the user's head.

In step 521, the electronic device may determine whether the head of the user is rotated, based on inertia information (e.g., the acceleration data and the angular velocity data). The electronic device may determine that the user is in danger in response to detecting head rotation, which exceeds at least one of a critical angular velocity and a critical angular velocity slope, based on the inertia information. The electronic device may detect a rapid change in an angular velocity and/or an angular acceleration while monitoring the collected angular acceleration data. Even without a physical interface, the electronic device may provide an ambient sound-hearing function in case rapid head rotation is detected as an intended input by the user.

FIG. 6 represents sensing data 610 while the user does not rotate the head and sensing data 620 while the user rotates the head, and the sensing data 610 and the sensing data 620 may represent a change 600 in an angular velocity value for each axis over time. A unit of the angular velocity illustrated in FIG. 6 may be a degree per second (dps). As shown in FIG. 6, in the sensing data 610 while the user does not rotate the head, a peak of the angular velocity may not appear, or in case the peak thereof appears, a peak 611 may have a low angular velocity value (e.g., 700 dps). In contrast, in the sensing data 620 while the user rotates the head, a plurality of peaks thereof may appear, and a peak 621 may have a relatively high angular velocity value (e.g., 3900 dps). The peak may appear in the angular velocity based on an X axis, the angular velocity based on a Y axis, and the angular velocity based on a Z axis.

For example, the electronic device may monitor the angular velocity based on each axis, and in case a monitored angular velocity exceeds a critical angular velocity (e.g., 3000 dps), the electronic device may determine that head rotation (e.g., rapid head rotation) has occurred. In another example, the electronic device may monitor the angular velocity based on each axis, and in case a slope (e.g., an angular acceleration) of a monitored angular velocity exceeds a critical angular velocity slope (e.g., a critical angular acceleration), the electronic device may determine that head rotation has occurred. In another example, in case the angular velocity exceeds the critical angular velocity and the angular acceleration exceeds the critical angular acceleration, the electronic device may determine that head rotation has occurred.

In case the electronic device determines that head rotation of the user has occurred as described in step 521, in step 522, the electronic device may determine that the user is in danger.

As described in step 430 of FIG. 4, in case the electronic device has determined that the user is in danger, the electronic device may activate ambient sound hearing during a predetermined play time. For reference, examples of FIGS. 11 and 12 may additionally determine whether the user has responded; however, in FIG. 5, head rotation of the user may already indicate and/or imply that the user is in danger. The embodiment shown in FIG. 5, for determining whether the user is in danger, may require determining that head rotation is sufficient, and may not require determining whether the user has responded.

FIGS. 7 to 10 illustrate an operation, performed by an electronic device, of determining danger based on a moving direction and a head orientation of a user, according to an embodiment.

In step 711, an electronic device may monitor whether a user wears the electronic device.

In step 712, the electronic device may collect sensing data (e.g., inertia information of the electronic device) by an inertia sensor, while the electronic device is worn on an ear of the user. As described above, the electronic device may collect acceleration data and angular velocity data.

In step 721, the electronic device may monitor a mismatch between a moving direction and a head orientation of the user, by using the inertia information. The moving direction may represent a direction in which the body of the user, who wears the electronic device, moves. The head orientation may represent a direction in which the head (e.g., the nose) of the user, who wears the electronic device, points. The mismatch between the moving direction and the head orientation may represent that a direction in which the user moves is different from a direction in which the user gazes.

For example, the electronic device may determine whether the user is walking by using the acceleration data, such as a pedometer, and in case the user is walking, the electronic device may determine a moving direction based on walking. In addition, the electronic device may estimate a walking posture through force applied to each axis of an acceleration sensor while walking. For example, the electronic device may estimate a posture based on force applied to each axis (e.g., the X axis, the Y axis, and the Z axis) as moving forward, and impulse up and down along an axis (e.g., the Y axis). In case vibration up and down along an axis (e.g., the Y axis) and force that occurs by moving forward shift to another axis, the electronic device may determine that the user, who is walking, drops the head or looks up. In this example, head rotation based on one axis (e.g., the Z axis) may be detected based on the acceleration data only.

Figure 8:
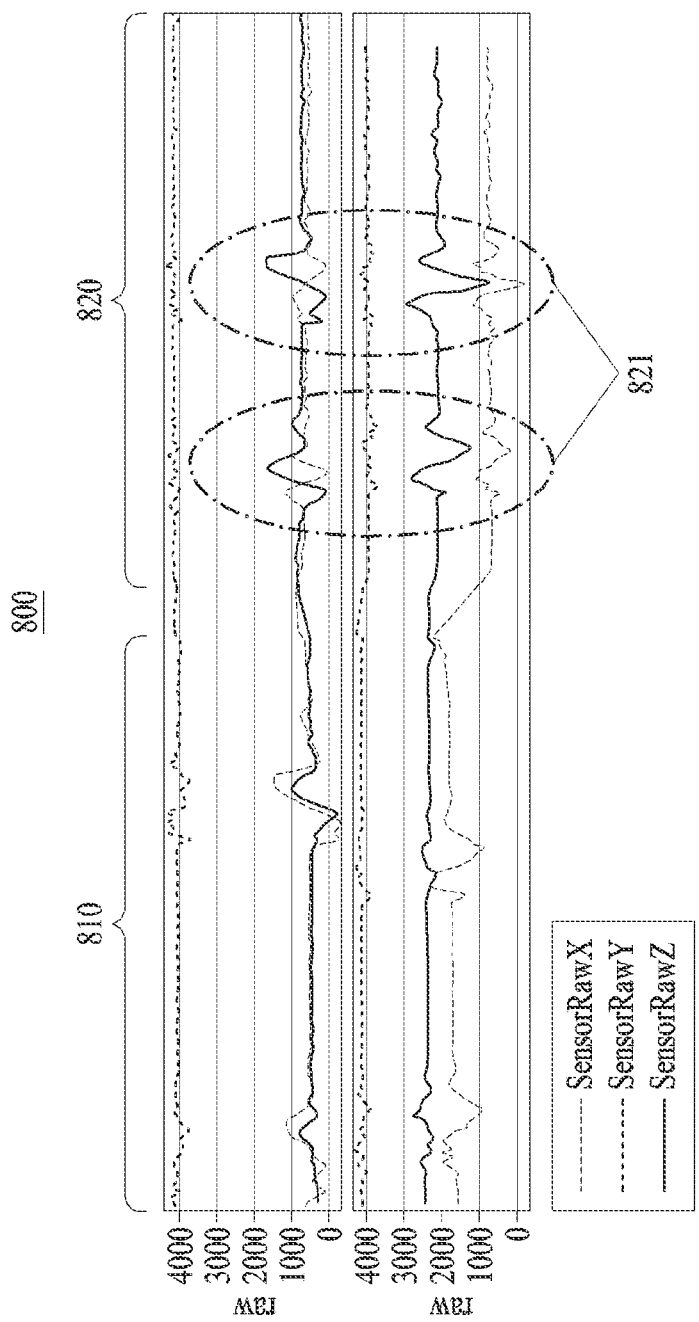
Figure 9:
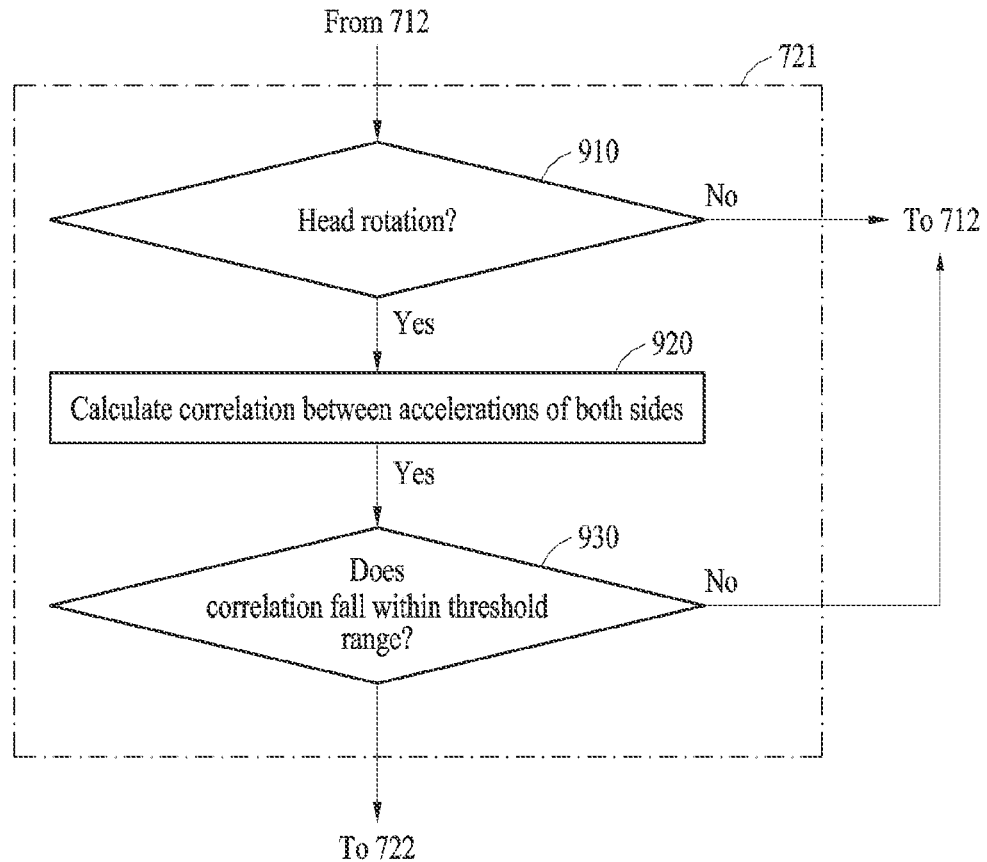
Figure 10:
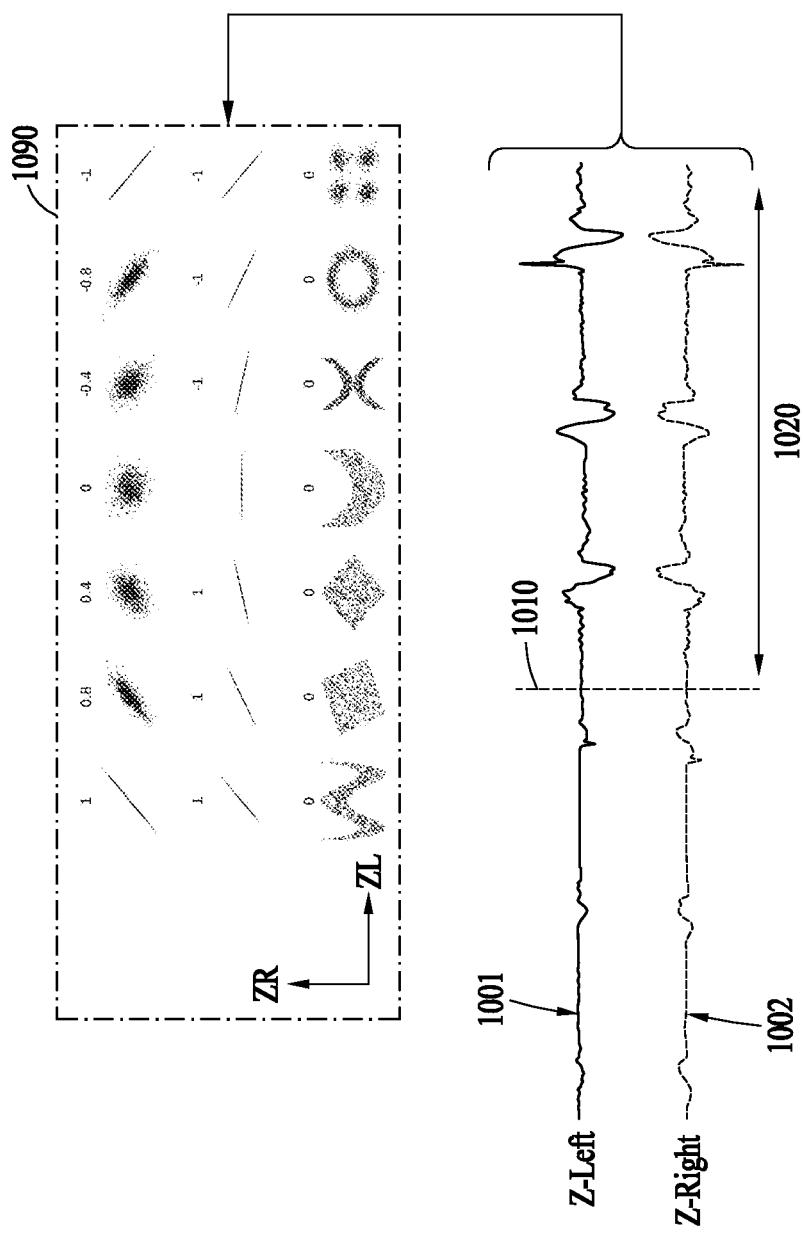

In another example, the electronic device may determine the mismatch between the moving direction and the head orientation based on a correlation between acceleration data of the inertia sensor (e.g., the acceleration sensor) accommodated in an earpiece and acceleration data of the inertia sensor accommodated in the other earpiece. Referring to FIG. 10, in case a correlation between first acceleration data 1001 obtained by sensing at a position corresponding to one of a pair of speakers and second acceleration data 1002 obtained by sensing at a position corresponding to the other speaker falls outside a predetermined threshold range, the electronic device may determine that a mismatch between the moving direction and the head orientation has occurred. FIG. 8 illustrates acceleration data 800 measured by an inertia sensor accommodated in each earpiece. An upper graph in the acceleration data 800 may represent acceleration values obtained by sensing at a position corresponding to the left earpiece and a left speaker, and a lower graph may represent acceleration values obtained by sensing at a position corresponding to the right earpiece and a right speaker. In a first time period 810, a correlation between left acceleration values and right acceleration values may not appear. On the other hand, in a second time period 820 in which a user is walking while rotating the head, inverted waves, which are inverted to each other, of the left acceleration values and the right acceleration values may appear in a period 821. The inverted waves may imply that a correlation between the first acceleration data 1001 and the second acceleration data 1002 is −1 in the period 821. In case there is no correlation between axes of both acceleration sensors, the electronic device may determine that the moving direction and the head orientation are different.

In another example, the electronic device may estimate the moving direction of the user by using the acceleration data of the acceleration sensor. The electronic device may estimate the head orientation of the user by using the angular velocity data of a gyro sensor. The electronic device may calculate an angular difference between the moving direction and the head orientation. In case the calculated angular difference exceeds a critical angular difference, the electronic device may determine that a mismatch between the moving direction and the head orientation has occurred.

In another example, the electronic device may receive potential external collision information from another external electronic device (e.g., an electronic device 104 of FIG. 1). The potential external collision information may be information on whether another device (e.g., a vehicle or a motorcycle) close to the user may collide with the user, and may be, for example, information indicating whether the other device is approaching a current location of the user or an expected moving path of the user. The other external electronic device may generate the potential external collision information by receiving, from another device, at least one of a moving direction, a moving speed, a moving acceleration, and a moving path of the other device, or a combination of two or more thereof. The electronic device may determine danger based on the moving direction of the user and the potential external collision information received from the other external electronic device.

With respect to step 721, determining a mismatch based on a correlation is described below. For example, referring to FIG. 9, in step 910, an electronic device may determine head rotation. The electronic device may detect the head rotation based on inertia information. Detecting the head rotation may be performed similarly to step 521 of FIG. 5; however, the example is not limited thereto. For example, the electronic device may determine a time point when head rotation of the user is triggered based on angular velocity values obtained by sensing by a gyro sensor of inertia sensors. For reference, the critical angular velocity (e.g., the first critical angular velocity) of FIG. 5 may have a different value from a critical angular velocity used in FIG. 9, and a further description is provided with reference to FIG. 13.

In step 920, the electronic device may calculate a correlation between accelerations of both sides. The accelerations of both sides may include the first acceleration data 1001, as shown if FIG. 10, obtained by sensing by a first inertia sensor accommodated in a first earpiece and the second acceleration data 1002 obtained by sensing by a second inertia sensor accommodated in a second earpiece. For example, the electronic device may calculate a correlation between the first acceleration data 1001 and the second acceleration data 1002, based on an axis (e.g., the ZL axis and the ZR axis) perpendicular to an outer surface of the earpiece.

As shown in FIG. 10, the electronic device may respectively extract, from the first acceleration data 1001 and the second acceleration data 1002, first target acceleration data and second target acceleration data corresponding to a time period 1020 (e.g., 3 seconds) determined by a time point of detecting the head rotation.

The electronic device may calculate a correlation between the first target acceleration data and the second target acceleration data. The electronic device may calculate the correlation between the first target acceleration data and the second target acceleration data based on Equation (1) shown below.

$$corr_{LR} = \frac{\sum_i^n (Acc_{L,i} - \overline{Acc_L})(Acc_{R,i} - \overline{Acc_R})}{\sqrt{\sum_i^n (Acc_{L,i} - \overline{Acc_L})^2} \sqrt{\sum_i^n (Acc_{R,i} - \overline{Acc_R})^2}} \quad (1)$$

In Equation (1), n may be an integer greater than or equal to 1 and may denote a sampling number within the time period 1020, and i may be an integer greater than or equal to or 1 and less than or equal to n and may denote an index corresponding to a time point when an acceleration value in the first target acceleration data and the second target acceleration data is sampled. $ACC_{L,i}$ and $ACC_{R,i}$ may respectively denote an i-th acceleration value in the first target acceleration data (e.g., left acceleration data) and an i-th acceleration value in the second target acceleration data (e.g., right acceleration data). $\overline{ACC_L}$ and $\overline{ACC_R}$ may respectively denote an average value of the first target acceleration data within the time period 1020 and an average value of the second target acceleration data within the time period 1020. Examples of correlation samples 1090 illustrated in FIG. 10 may represent acceleration values sampled within the time period 1020 with a value of the ZL axis as the horizontal axis and a value of the ZR axis as the vertical axis. In case a correlation is 0, a random pattern may appear, in case the correlation approaches 1, a linearly increasing shape may appear, and in case the correlation approaches −1, a linearly decreasing shape may appear.

In step 930, the electronic device may determine whether the calculated correlation falls outside a predetermined threshold range. For example, the electronic device may determine whether a correlation coefficient (e.g., a coefficient calculated based on Equation (1)) indicating a correlation calculated for a predetermined time period (e.g., 3 seconds) from a time point 1010, when head rotation is detected, to a time point 1020 falls outside a threshold range less than or equal to 1 and greater than −0.5. In other words, the electronic device may determine that the correlation coefficient falls within a range (e.g., a mismatch range) less than or equal to −0.5 and greater than −1. In case the calculated correlation falls outside the threshold range and falls within the mismatch range, the electronic device may determine that a moving direction does not match a head orientation of a user. In case the correlation falls within the threshold range, the electronic device may return to step 712 of FIG. 7 and continue to collect the inertia information.

In step 722, the electronic device may determine whether the user is in danger based on a result of monitoring the mismatch between the moving direction and the head orientation. In case the mismatch is detected, the electronic device may determine that the user is in danger.

As described in step 430 of FIG. 4, in case the electronic device has determined that the user is in danger, the electronic device may activate ambient sound hearing during a predetermined play time.

Figure 11:
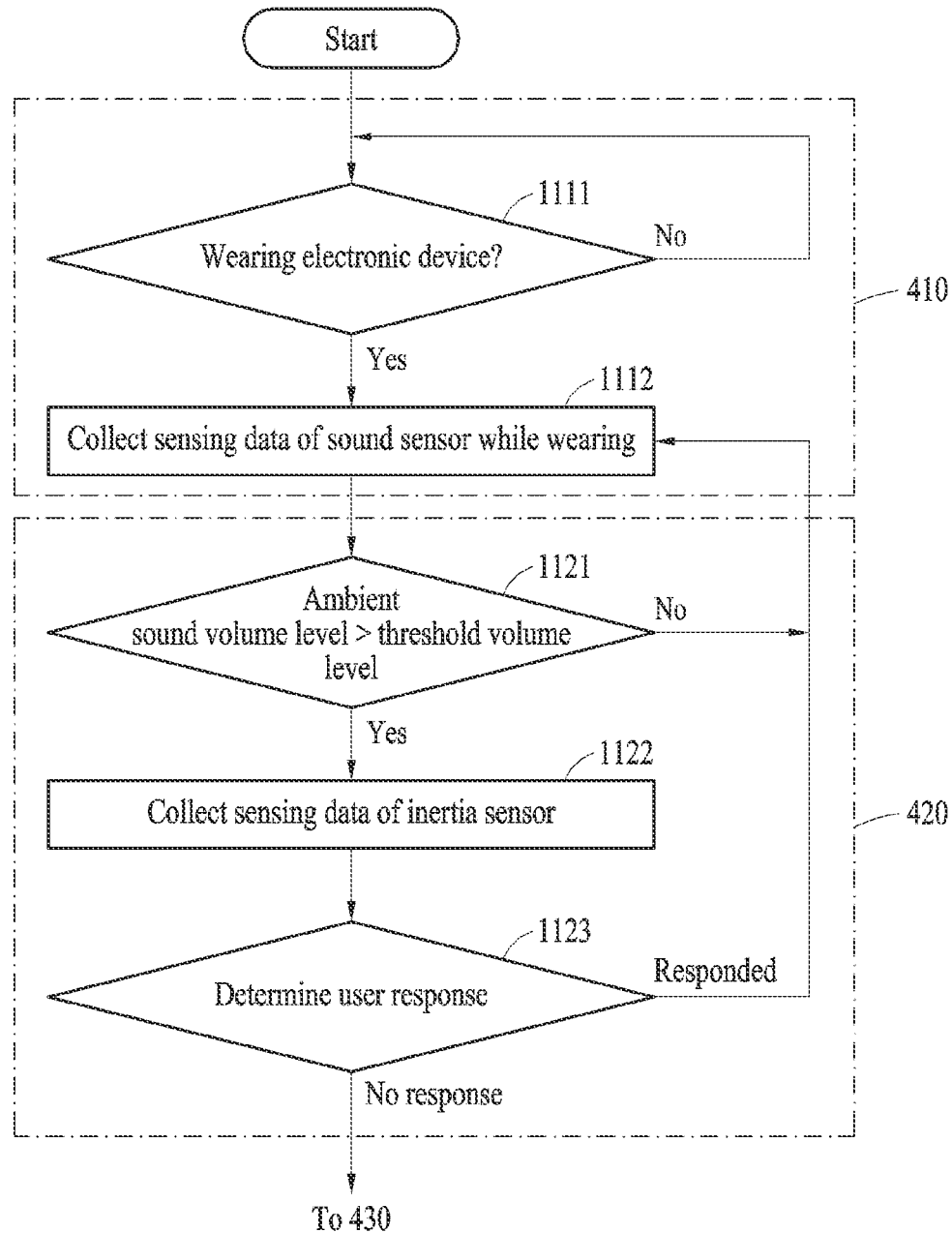
FIGS. 11 and 12 illustrate an operation, performed by an electronic device, of determining danger based on a response of a user, according to an embodiment.
Figure 12:
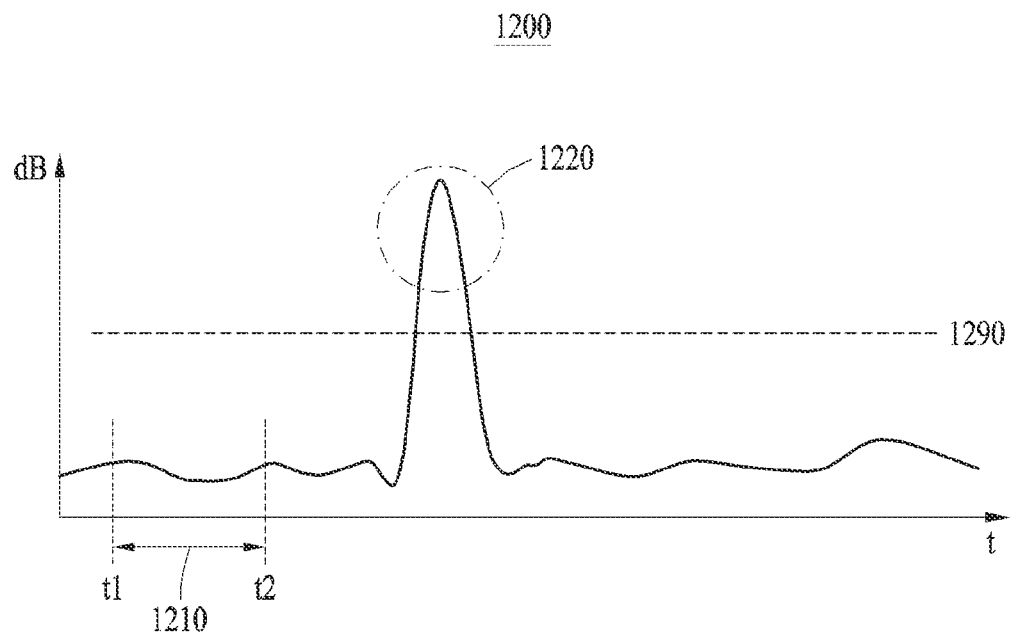

FIGS. 11 and 12 illustrate an operation, performed by an electronic device, of determining danger based on a response of a user according to an embodiment.

In step 1111, an electronic device may monitor whether a user wears the electronic device.

In step 1112, the electronic device may collect sensing data (e.g., a sound signal including ambient sound) through a sound sensor (e.g., a microphone) while the electronic device is worn on an ear of the user.

In step 1121, the electronic device may monitor whether a volume level of the ambient sound exceeds a threshold volume level 1290 of FIG. 12. In case the volume level of sound collected through the sound sensor exceeds the threshold volume level 1290, the electronic device may determine whether the user has responded. In the present disclosure, the sound exceeding the threshold volume level 1290 may be referred to as an impact sound. In case the volume level of the sound collected through the sound sensor is less than or equal to the threshold volume level 1290, the electronic device may return to step 1112 and continue to collect the sound signal. As shown in graph 1200 of FIG. 12, the electronic device may calculate an average volume level value for ambient sound for a previous time period 1210 (e.g., from time point t1 to time point t2) during a predetermined time length based on a target time point (e.g., a current time point). The average volume level value may be a volume level of sound caused by continuous white noise. The electronic device may determine a threshold volume level 1290 based on the average volume level value of the previous time period 1210. The threshold volume level 1290 may be set to a volume level which is greater than the average volume level value by a predetermined offset volume level (e.g., 70 dB). In case a sound peak 1220 is detected while monitoring the ambient sound, the electronic device may determine whether the collected sound is impact sound by comparing the sound peak to the threshold volume level.

In step 1122 of FIG. 11, the electronic device may collect the sensing data of the inertia sensor. For example, the electronic device may collect acceleration data and/or angular velocity data for determining responsiveness of the user with respect to the impact sound.

In step 1123, the electronic device may determine whether the user has performed a response action. According to an embodiment, the electronic device may determine whether the user has responded based on performing a response action including at least one or a combination of two or more of a response time, a response magnitude, and a response direction of the user for the impact sound, which exceeds the threshold volume level 1290.

For example, the electronic device may determine whether the user has responded to the impact sound based on the response time. The electronic device may determine whether the head of the user rotates within a threshold response time from a time point of detecting the impact sound. The electronic device may determine that the user has responded to the impact sound in case the head of the user rotates within the threshold response time. In another example, the electronic device may determine whether the user has responded to the impact sound based on the response magnitude. In response to the impact sound, the electronic device may determine the response magnitude based on a speed of head rotation (e.g., a rotation angular velocity) and an acceleration of the head rotation (e.g., a rotation angular acceleration), and in case the response magnitude exceeds the threshold response magnitude, the electronic device may determine that the user has responded to the impact sound. In another example, the electronic device may determine whether the user has responded to the impact sound based on the response direction. In case head orientation of the user points to a direction where a sound source causing the impact sound is located, the electronic device may determine that the user has responded.

In addition, based on the response time and the response direction, the electronic device may determine that the user has responded. In case the head orientation of the user points to a location where the impact sound has occurred within the threshold response time determined based on the volume level of the impact sound, the electronic device may determine that the user has responded.

For example, based on a difference of sound by a same sound source between a volume level sensed by a sensor disposed in one earpiece (e.g., a left sound sensor) and a volume level sensed by a sensor disposed in another earpiece (e.g., a right sound sensor), the electronic device may estimate a relative position and/or a direction of the sound source. The electronic device may determine whether the head orientation of the user is changed to point toward an estimated location of the sound source, based on acceleration data and/or angular velocity data of the inertia sensor. In other words, the electronic device may determine whether the user has responded toward a direction of the sound source causing the impact sound. For example, in case the user has quickly responded to the left within the threshold response time or at least one condition is satisfied in response to sound from a left side based on the electronic device, the electronic device may determine that the user has responded.

The electronic device may set the threshold response time based on a difference between an average volume level in the previous time period 1210 and a volume level of the impact sound. The electronic device may determine the threshold response time, which is inversely proportional to the difference between the average volume level and the volume level of the impact sound. The threshold response time described above may be calculated by Equation (2) shown below.

$$RespTime = \frac{1}{\text{Impact dB} - \text{Average dB}} \times 50(sec) \quad (2)$$

In Equation (2), RespTime may denote a threshold response time, ImpactdB may denote a volume level of an impact sound, and AveragedB may denote an average volume level in the previous time period 1210. For example, in case an impact sound of 100 dB has occurred while AveragedB is 50 dB, the electronic device may set the threshold response time to 1 sec. However, the above-described Equation (2) is merely an example, and the example is not limited thereto. The electronic device may demand a faster response time from a user as noise of which a volume level is greater than the average volume level has occurred.

The electronic device may determine whether the user is in danger based on the determined response. In case the head orientation of the user does not face toward a location where the impact sound has occurred until the threshold response time, which is determined based on the volume level of the impact sound, elapses, the electronic device may determine that the user is in danger. As described in step 430 of FIG. 4, in case the electronic device has determined that the user is in danger, the electronic device may activate ambient sound hearing during a predetermined play time. For example, in response to a late response or no response from the user, the electronic device may automatically activate ambient sound hearing for inducing a user response since the user may miss the impact sound because of using the stereo headset device. The electronic device may provide the ambient sound to the user who is determined to be in danger through a pair of speakers, based on the impact sound exceeding the threshold volume level. Thereafter, in case ambient noise decreases, the electronic device may deactivate an ambient sound hearing function. In case the impact sound has been removed, the electronic device may terminate providing ambient sound through the pair of speakers. Therefore, the electronic device may induce an appropriate user response to the surrounding environment by automatically activating ambient sound hearing during a predetermined period in case the user is in danger.

The electronic device may determine that the user is safe in case the user has responded normally within the threshold response time. While the user is safe, the electronic device may deactivate ambient sound playing.

Figure 13:
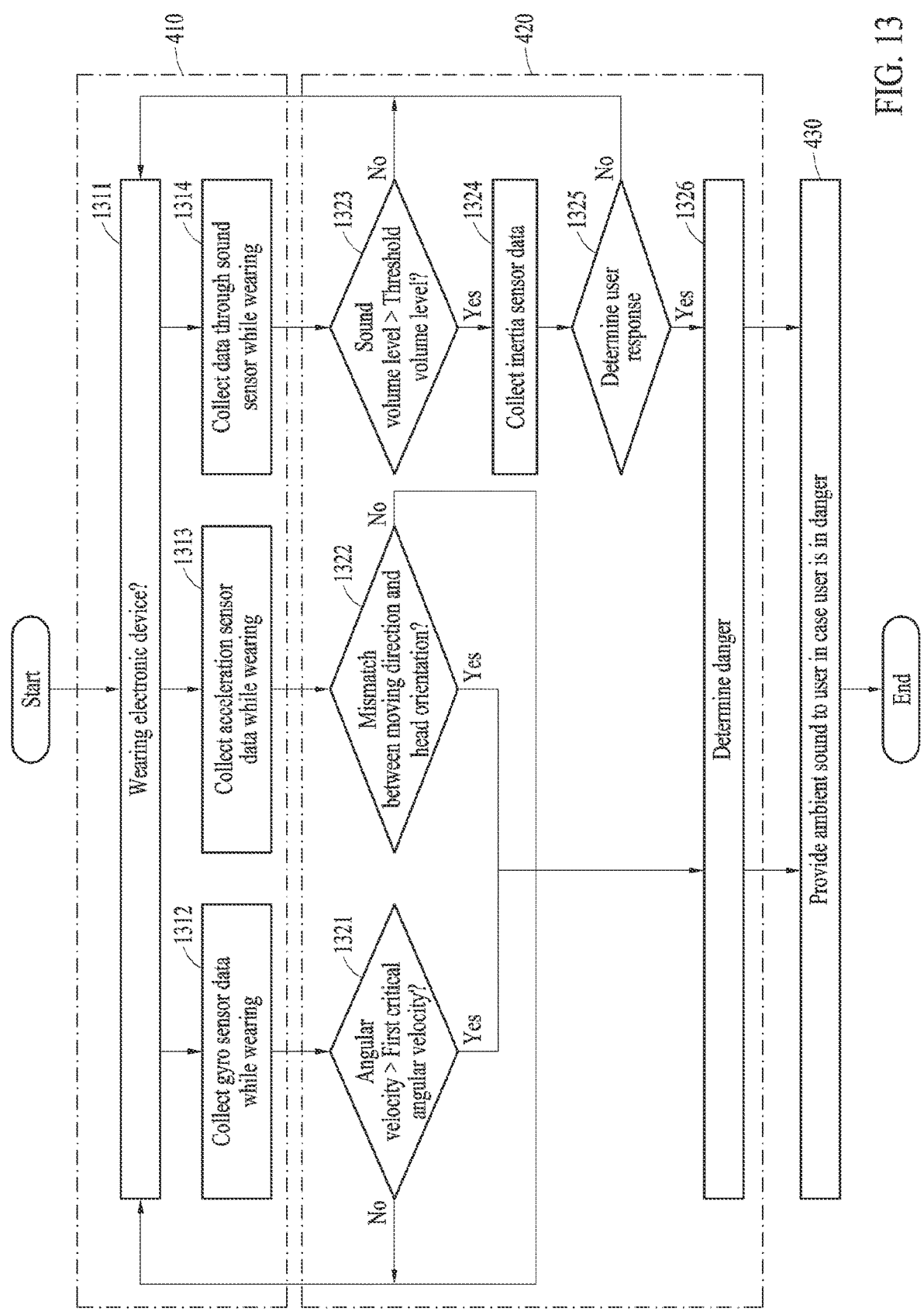
FIG. 13 is a flowchart illustrating an operation, performed by an electronic device, of determining danger based on head rotation, a mismatch between a moving direction and a head orientation, and a user response, and providing ambient sound, according to an embodiment.

FIG. 13 is a flowchart illustrating an operation, performed by an electronic device, of determining danger based on head rotation, a mismatch between a moving direction and a head orientation, and a user response, and providing ambient sound.

In step 1311, the electronic device may monitor whether the electronic device is worn. As described above, the electronic device may determine whether an earpiece of the electronic device is closely worn on an ear of a user through a wear detecting sensor. The electronic device may collect various pieces of information after the electronic device has been worn.

The electronic device may generate inertia information of the electronic device by an inertia sensor while the electronic device is worn on the ear of the user. For example, in step 1312, the electronic device may collect data of a gyro sensor while the electronic device is worn. In step 1313, the electronic device may collect data of an acceleration sensor while the electronic device is worn. In step 1314, the electronic device may collect data of a sound sensor while the electronic device is worn.

In step 1321, the electronic device may determine whether an angular velocity monitored by the gyro sensor exceeds a first critical angular velocity. The electronic device may continue to collect data, in case the angular velocity is less than or equal to the first critical angular velocity. In response to the angular velocity exceeding the first critical angular velocity, the electronic device may determine that rapid head rotation has occurred, and in step 1326, the electronic device may determine that the user is in danger.

In step 1322, the electronic device may determine a mismatch between a moving direction and a head orientation. For example, in case head rotation has occurred, the electronic device may determine, similar to step 721 of FIG. 7, a mismatch between a moving direction and a rotated head orientation. Here, the electronic device may determine that the head rotation has occurred in case the angular velocity is less than or equal to the first critical angular velocity and exceeds a second critical angular velocity. The second critical angular velocity may be less than the first critical angular velocity. In other words, in case the speed of the head rotation, which is slower than the head rotation in step 1321, has occurred, the electronic device may determine whether the user is in danger by additionally considering the mismatch between the moving direction of the body and the rotated head orientation.

In step 1323, the electronic device may determine whether a volume level of sound exceeds a threshold volume level. In case the impact sound is not detected, the electronic device may continue to collect sound. In step 1324, in case the impact sound is detected, the electronic device may collect inertia sensor data. In step 1325, the electronic device may determine whether the user has responded based on inertia information. For example, the electronic device may determine that the user is in danger in case the electronic device fails to detect head rotation of the user from a time point of detecting sound, which is greater than or equal to the threshold volume level, from ambient sound, until a predetermined threshold response time elapses.

In step 1326, the electronic device may determine whether the user is in danger based on above-described steps 1321, 1322, and 1325.

As described above in FIG. 4, in step 430, the electronic device may provide ambient sound to the user in case the user is in danger. For example, a pair of speakers of the electronic device may output collected ambient sound to the user while the user is in danger.

According to an embodiment, the electronic device may control an ambient sound-hearing function by using data collected by a microphone and an inertia sensor typically installed on the stereo headset device. As described above, the electronic device may activate the ambient sound-hearing function when the function is needed by detecting the head rotation by the inertia sensor and detecting a time point when the ambient sound-hearing function is needed through the microphone. Therefore, in case of an emergency, the electronic device may induce a necessary response from the user, who wears the stereo headset that seals the ambient sound, through the ambient sound-hearing function while minimizing disturbance to music being listened to.

According to an embodiment, an electronic device may prevent a danger, which may occur as a user, who wears a stereo headset device, moves, by providing ambient sound in case a moving direction of a body part and a head orientation of the user does not match.

According to an embodiment, an electronic device may prevent a user from being exposed to a danger, which has occurred from a direction in which a user does not gaze, by providing ambient sound based on head rotation.

According to an embodiment, an electronic device may secure user safety by calling attention of a user, who wears a stereo headset device that seals ambient sound, by providing the ambient sound in case a volume level of the ambient sound is high.

Additionally, the electronic device may provide convenience to the user by activating the ambient sound playing without additional control in response to an action of nodding of the head as intended by the user and an utterance exceeding a threshold volume level from the mouth of the user. In response to determining that activation of the ambient sound hearing is required without a complicated control, the electronic device may induce activation of the ambient sound playing by performing the above-described actions.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
an inertia sensor configured to sense inertia of the electronic device while the electronic device is worn on an ear of a user;
a processor configured to monitor a mismatch between a moving direction and a head orientation of the user by using inertia information on the sensed inertia, and determine whether the user is in danger based on a result of monitoring the mismatch between the moving direction and the head orientation;
a sound sensor configured to collect ambient sound; and
a pair of speakers configured to output collected ambient sound while the user is determined to be in danger,
wherein the processor is further configured to determine that the mismatch between the moving direction and the head orientation has occurred in case a correlation between first acceleration data obtained by sensing at a position corresponding to one of the speakers and second acceleration data obtained by sensing at a position corresponding to the other speaker falls outside a predetermined threshold range.

2. The electronic device of claim 1, further comprising:
an earpiece configured to seal the ear of the user from the ambient sound in case the electronic device is worn on the ear of the user; and
a housing accommodating the pair of speakers and connected to the earpiece.

3. The electronic device of claim 1, wherein the processor is further configured to:
detect head rotation based on the inertia information,
extract, from the first acceleration data and the second acceleration data, respectively, first target acceleration data and second target acceleration data corresponding to a time period determined based on a time point when the head rotation is detected, and
calculate the correlation between the first target acceleration data and the second target acceleration data.

4. The electronic device of claim 1, wherein the processor is further configured to determine that the user is in danger in case head rotation, which exceeds at least one of a critical angular velocity and a critical angular velocity slope based on the inertia information, is detected.

5. The electronic device of claim 1, wherein the processor is further configured to, in case a volume level of sound collected through the sound sensor exceeds a threshold volume level, determine whether the user has performed a response action, and
determine whether the user is in danger based on the determination whether the user has performed the response action.

6. The electronic device of claim 5, wherein the processor is further configured to determine whether the user has performed the response action to impact sound, which exceeds the threshold volume level, based on performing a response action including at least one or a combination of two or more of a response time, a response magnitude, and a response direction of the user.

7. The electronic device of claim 6, wherein the processor is further configured to determine that the user is safe in case the head orientation of the user points to a location in which the impact sound has occurred within a threshold response time determined based on a volume level of the impact sound.

8. The electronic device of claim 6, wherein the processor is further configured to determine that the user is in danger in case the head orientation of the user does not point to a location in which the impact sound has occurred until a threshold response time, determined based on a volume level of the impact sound, elapses.

9. The electronic device of claim 1, wherein the processor is further configured to provide the ambient sound through the pair of speakers to the user who is determined to be in danger, based on impact sound exceeding a threshold volume level, and terminate providing the ambient sound through the pair of speakers in case the impact sound has been removed.

10. A method performed by an electronic device, the method comprising:

sensing inertia of the electronic device while the electronic device is worn on an ear of a user;

monitoring a mismatch between a moving direction and a head orientation of the user by using inertia information related to the sensed inertia;

determining whether the user is in danger based on a result of monitoring the mismatch between the moving direction and the head orientation; and outputting collected ambient sound while determining that the user is in danger, wherein determining whether the user is in danger comprises determining that the mismatch between the moving direction and the head orientation has occurred in case a correlation between first acceleration data obtained by sensing at a position corresponding to one of a pair of speakers and second acceleration data obtained by sensing at a position corresponding to the other speaker falls outside a predetermined threshold range.

11. The method of claim 10, wherein monitoring the mismatch comprises:

detecting head rotation based on the inertia information;

extracting, from the first acceleration data and the second acceleration data respectively, first target acceleration data and second target acceleration data corresponding to a time period determined based on a time point when the head rotation is detected; and calculating the correlation between the first target acceleration data and the second target acceleration data.

12. The method of claim 10, further comprising:

determining that the user is in danger in case head rotation, which exceeds at least one of a critical angular velocity and a critical angular velocity slope based on the inertia information, is detected.

13. The method of claim 10, further comprising:

in case a volume level of sound collected through a sound sensor exceeds a threshold volume level, determining whether the user has performed a response action; and determining whether the user is in danger based on the determination whether the user has performed the response action.

14. The method of claim 13, wherein determining whether the user has performed the response action comprises determining whether the user has responded to impact sound, which exceeds the threshold volume level, based on performing a response action including at least one or a combination of two or more of a response time, a response magnitude, and a response direction of the user.

15. The method of claim 14, wherein determining whether the user is in danger based on the determination whether the user has performed the response action comprises determining that the user is safe in case the head orientation of the user points to a location in which the impact sound has occurred within a threshold response time determined based on a volume level of the impact sound.

16. The method of claim 14, wherein determining whether the user is in danger based on the determination whether the user has performed the response action comprises determining that the user is in danger in case the head orientation of the user does not point to a location in which the impact sound has occurred until a threshold response time, determined based on a volume level of the impact sound, elapses.

17. A non-transitory computer-readable storage medium storing instructions that, when executed by a processor, cause the processor to perform the method of claim 10.

* * * * *